United States Patent Office 2,754,335
Patented July 10, 1956

2,754,335
TRIPHENYLOLS

Howard L. Bender, Bloomfield, Alford G. Farnham, Caldwell, and John W. Guyer and Thomas B. Gibb, Verona, N. J., assignors to Union Carbide and Carbon Corporation, a corporation of New York No Drawing. Application September 6, 1950,
Serial No. 183,466

5 Claims. (Cl. 260—619)

This invention is concerned with the production of novel triphenylols or trihydroxy phenols derived from intermediates obtained by reacting phenol with formaldehyde.

The trihydroxy phenols or triphenylols of the present invention have the general structural formula

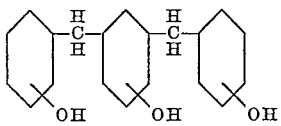

wherein each methylene connector or bridge between adjacent rings is attached to such rings in a position ortho or para with respect to the hydroxyl groups of the thus connected rings.

There are seven theoretically possible isomers of these triphenylols, and all have now been made. The majority of the isomers have been isolated in the form of sharp melting, permanently fusible resins and two isomers have also been isolated in the form or crystals as well as resinous masses.

The individual structural formulas of the seven isomers which have been presently produced as relatively pure compounds are as follows, each being named on the basis of substituted phenol:

Isomer I—2,4-bis-(2-hydroxybenzyl) phenol:

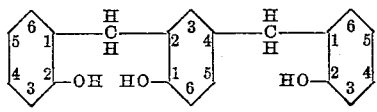

Isomer II—2,4-bis-(4-hydroxybenzyl) phenol:

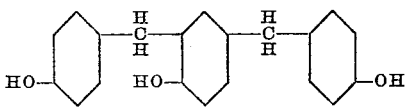

Isomer III—2,6-bis-(2-hydroxybenzyl) phenol:

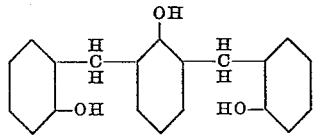

Isomer IV—2,6-bis-(4-hydroxybenzyl) phenol:

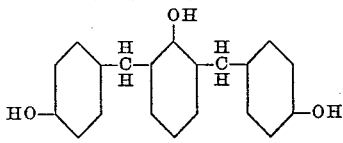

Isomer V—2-(2-hydroxybenzyl)-4-(4-hydroxybenzyl) phenol:

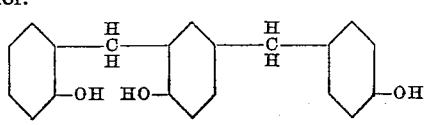

Isomer VI — 2-(4-hydroxybenzyl)-4-(2-hydroxybenzyl) phenol:

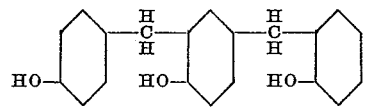

Isomer VII—2-(2-hydroxybenzyl)-6-(4-hydroxybenzyl) phenol:

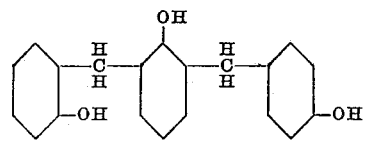

The question of intramolecular hydrogen bonding between the hydroxyl groups of adjacent rings is of interest in these seven isomeric three-ring compounds. This type hydrogen bonding has been called 2,2′ structure in U. S. 2,467,207, and 2,475,587. The structural factors of hydrogen bonding and of open para positions are found to have a direct bearing on the heat-hardening reaction rates of these resinous and crystalline products with formaldehyde or other methylene engendering compounds. In the cases of Isomers II, IV and VI there seems no possibility of intrahydrogen bonding. Isomer III can exist as hydrogen bonded, partly hydrogen bonded, and unbonded. It has been found to exist in both crystalline and glassy products. Isomers I, V and VII can exist in both bonded and unbonded forms but are known only in the resinous or glassy state. The various rotational configurations of Isomer III are illustrated as follows:

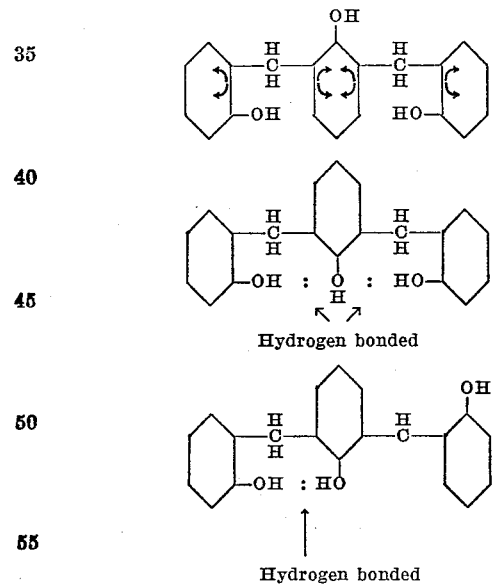

All the isomers are reactive with formaldehyde, or its polymers such as paraform, or its ammonia derivative hexamethylenetetramine to form industrially valuable resins which are heat-hardenable to infusible masses. The isomers are also reactive with dichloroethane yielding infusible polyether resins. In this respect the isomers behave differently than the diphenylols which form non-heat-hardening resins when reacted similarly with dichloroethane as heretofore described in the Arvin U. S. Patent 2,060,715.

Table I depicting the heat-hardening reaction speeds of these novel triphenylols with hexamethylenetetramine and with formaldehyde is given below. Each isomer was tested with enough hexamethylenetetramine (19 per cent by weight on the resinous or crystalline isomers of molecular weight 306) for the final reaction product to contain 1.5 total methylenes per ring. This value is the theoretical value for maximum hardness of a final cross-linked resinoid. The formaldehyde tests were made at the same 1.5 methylene per ring value but with 5 per cent added NaOH catalyst and at 100° C. in a 50 per cent water solution. The hexamethylenetetramine tests were made under anhydrous conditions at 160° C. The products vary by a factor of 8 in hexamethylenetetramine hardening and by a factor of 5 in formaldehyde hardening under these conditions.

TABLE I

| Isomer | Name as a phenol | Hexamethylenetetramine rate at 160° C., seconds | Formalin rate at 100° C., minutes |
| --- | --- | --- | --- |
| I | 2,4-bis-(2-hydroxybenzyl) | 56 | 16 |
| II | 2,4-bis-(4-hydroxybenzyl) | 160 | 60 |
| III | 2,6-bis-(2-hydroxybenzyl) | 20 | 12 |
| IV | 2,6-bis-(4-hydroxybenzyl) | 80 | 50 |
| V | 2-(2-hydroxybenzyl)-4-(4-hydroxybenzyl) | 74 | 32 |
| VI | 2-(4-hydroxybenzyl)-4-(2-hydroxybenzyl) | 135 | 49 |
| VII | 2-(2-hydroxybenzyl)-6-(4-hydroxybenzyl) | 56 | 18 |

While it has been reported that trinuclear phenols of the type

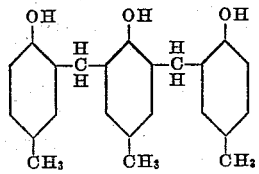

were obtained by reacting para cresol with formaldehyde (Koebner, M., angew. Chem., 46, 251-6, 1933) these methyl substituted triphenols when reacted with formaldehyde yield only linear chained, non-heat-hardening, permanently fusible resins.

We have found several methods to prepare the novel triphenylols, all being based on condensation reactions of a suitable phenol and a methylol substituted phenol. One practical method is to react via condensation a molar quantity of ortho, ortho-dimethylol phenol, or ortho, para-dimethylol phenol and two or more moles of phenol in accordance with the following reaction.

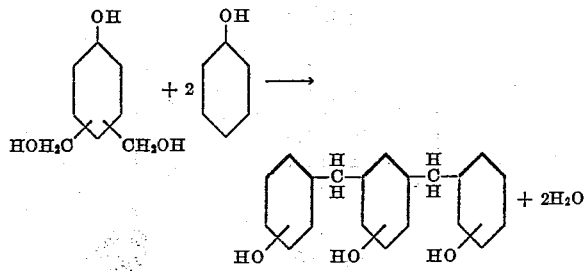

Another condensation method is to react a suitable diphenylol with formaldehyde to form a monomethylol diphenylol and then to react it with an equimolar quantity or more of phenol, as illustrated below:

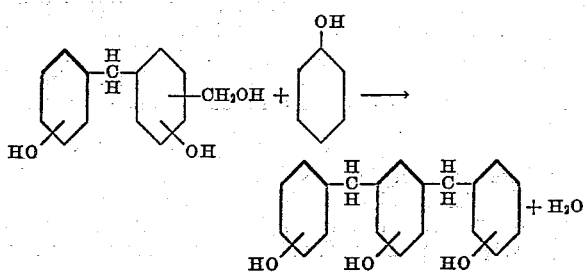

These first two methods are often attended however by further condensation reactions resulting in the formation of mixed resinous masses comprising methylene chained products of more than three benzene rings, and thus the yield of the desired three ring triphenylols is diminished accordingly.

The third and presently preferred method for producing the novel triphenylols in maximum yields and with minimum formation of higher condensation products is to react a diphenylol methane with a monomethylol phenol, for example 2-hydroxybenzyl alcohol or 4-hydroxybenzyl alcohol. These monomethylol phenols are conveniently prepared by reacting phenol with formaldehyde by methods well known to the art. The isomeric diphenylol methanes, also identified as hydroxy, hydroxy'-diphenyl methanes, in most instances are conveniently prepared by reacting phenol with formaldehyde under suitable conditions. Preparation and isolation in purified form of the diphenylols useful in the present invention as intermediates are described in the Bender et al. U. S. Patent 2,464,207.

The condensation reaction of such diphenylols with a hydroxybenzyl alcohol is considered to be as follows:

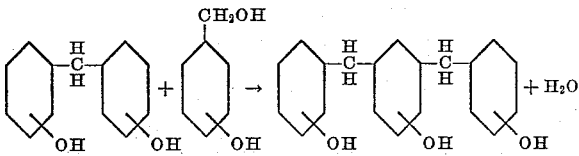

In the reaction of a specific diphenylol methane with a specific hydroxybenzyl alcohol, a mixture of isomeric triphenylols is frequently obtained. There are two exceptions, however, one being in the condensation reaction of para-hydroxybenzyl alcohol and 4,4'-dihydroxy diphenyl methane, the sole three ring phenol formed therefrom being 2,4-bis-(4-hydroxybenzyl) phenol. The other exception occurs in the condensation of saligenin (ortho-hydroxybenzyl alcohol) and 4,4' - dihydroxy-diphenyl methane, from which reaction only 2-(2-hydroxybenzyl)-4-(4-hydroxybenzyl) phenol could be isolated as the sole three ring isomer.

In the condensation of diphenylol isomers other than 4,4'-dihydroxy diphenyl methane with a hydroxybenzyl alcohol, the yield of certain triphenylol isomers can be favorably increased by maintaining suitable pH conditions during the condensation reaction. For example, a pH between 4.5 and 10.0 and for maximum yields preferably between 5.0 and 7.0, favors the production of triphenylols having at least one methylene connector attached to an ortho nuclear carbon atom in one of the phenolic rings. This result is obtained by the catalyst promoting condensation of the methylol group in the hydroxybenzyl alcohol with an ortho hydrogen atom in either rings of the diphenol.

Of particular interest is the discovery that the novel triphenylols can be made by directly condensing formaldehyde and phenol, providing the reaction mass contains more than equimolar quantities of phenol, and the reaction is conducted within specific pH ranges and preferably in the presence of certain catalysts. This direct method will be hereinafter described in greater detail.

The reaction of 2,2'-dihydroxydiphenylmethane with 2-hydroxybenzyl alcohol has yielded as one product an isomer which can be in either crystalline or resinous form. The crystalline form of the isomer is obtained by crystallization of the isomer from solutions at room temperature in benzene or mixtures of benzene and acetone or by subjecting the molten isomer (170° C.) to a slow cooling cycle of about 10° C. per hour. Crystallization begins when the temperature has dropped to about 160° C. Cooling the molten isomer at about 10° C. per minute yields the resinous form. Both forms when pure melt at 161–163° C. and these by proper tests were proven to be 2,6-bis-(2-hydroxybenzyl) phenol (Isomer III). Solid hexamethylenetetramine acts as a flux for the crystalline form of this isomer and enables the solid crystals to first form a lower melting solution, then ammonia is released and the mass proceeds to react to an infusible solid, which, when the temperature is raised will finally slowly char at about 250° C. without melting.

The second product formed by reaction of 2,2'-dihydroxydiphenyl methane and 2-hydroxybenzyl alcohol is a distillable sharp melting resin, which was identified as Isomer I. It reacts with hexamethylenetetramine at the 1.5 methylene ratio to form an infusible resin in 51 seconds at 160° C. Different batches gave molecular weight measurements from 300 to 320 and melting points from 110–120° C. Hydroxyl content by the acetic anhydride-pyridine method was found to be between 15.7 and 15.8 per cent. In purifying this product for the hydroxyl determination there were some signs of slight dehydration in the distillation of the product.

Reaction of 4,4'-dihydroxydiphenylmethane with 2-hydroxybenzyl alcohol gave a resinous product which could be distilled. The resinous distillate collected at 220–240° C. and at 0.5 mm. pressure was initially a soft resin. This resin by means of infra-red measurements and hydroxyl tests was identified as Isomer V. Various lots heat-hardened to infusible resins in test values between 70 and 80 seconds at 160° C. using hexamethylenetetramine in amount for the heat-hardened product to contain 1.5 total methylenes per ring. The molecular weight varied between 300–330 by various systems of measurement.

Reaction of 2,2'-dihydroxydiphenylmethane with 4-hydroxybenzyl alcohol has given resinous products. Theoretically this reaction can yield two different isomers and this was confirmed in the isolation therefrom of Isomers V and VII. Isomer V was produced when 1 mole 2,2'-dihydroxydiphenylmethane was reacted with a mole of 4-hydroxybenzyl alcohol at an acid pH between 3.5 and 4.0 using an organic or inorganic acid such as gaseous hydrochloric acid or oxalic acid as a catalyst and at a reaction temperature of 140–150° C. Such a reaction gave a resinous distillate boiling between 230 and 245° C. at 1 mm. pressure in a yield of 56 per cent of theory. The resinous distillate gave reasonable tests for a hydroxyl content and molecular weight corresponding to a triphenylol. Infra-red data indicated a structure corresponding to Isomer V. The distillate reacted with hexamethylenetetramine at the 1.5 methylene per ring ratio (this is 19 per cent by weight of hexamethylenetetramine on the resinous distillate) gave a heat-hardening speed of 74 seconds at 160° C.

A product identified as Isomer VII was produced in crude form when 1 mole 2,2'-dihydroxydiphenylmethane was reacted with 1 mole of 4-hydroxybenzyl alcohol at a pH between 5 and 6 using zinc oxide, aluminum oxide or magnesium oxide or their basic salts such as zinc acetate, zinc rosinate, aluminum acetate, magnesium stearate to obtain the desired pH. A resinous distillate boiling between 235 and 245° C. at 1.0 mm. pressure in a 55% yield of theory was separated from the reactive mass. The distillate reacted with hexamethylenetetramine (19 per cent by weight of the resin) for heat-hardening speed, it gave tests of 53–55 seconds at 160° C. This distillate was identified as Isomer VII by means of infra-red data, hydroxyl content and molecular weight determinations.

Reaction of 2,4'-dihydroxydiphenylmethane with 4-hydroxybenzyl alcohol has given distilled resinous products of the triphenylol type. Conducting the reaction at pH 4 to 6, gave a resinous mixture which seemed to consist of Isomers IV and VI, along with a small yield of Isomer II. This mixture after removal of Isomer II by crystallization from toluene when reacted at 160° C. with 18 per cent by weight thereof of hexamethylenetetramine formed infusible resins in 130 to 140 seconds. Infra-red measurements on this triphenylol mixture free of Isomer II showed 85 per cent para ends and 15 per cent ortho ends.

Reaction of 2,4'-dihydroxydiphenyl with 4-hydroxybenzyl alcohol at pH 3–4 gave Isomer II in good yield as a crystalline product having a melting point of 149°–150° C. and as a resinous product of the same melting point.

Reaction of 2,4'-dihydroxydiphenylmethane with 2-hydroxybenzyl alcohol at a pH of 4 to 6 gave a distillable resinous product which seemed to be a mixture of Isomers I and VII. Infra-red measurements of the distilled product indicated 78.5 per cent ortho ends and 21.5 per cent para ends. The same reaction carried out at pH 3–4 gave a good yield of Isomer VI as a resinous product.

Proofs of the chemical structure for these triphenylol products was undertaken since none of these isomers have been identified in the known chemical literature.

The structure given for 2,4-bis-(4-hydroxybenzyl)phenol, Isomer II, is reasonable because the method of production gives a proper yield ratio. If 4,4'-dihydroxydiphenylmethane and 4-hydroxybenzyl alcohol, whose structures are established, react without deepseated changes, such as rearrangement, to yield a mole of water as the only by-product, then only one product having a molecular weight of 306 is to be expected. Since the methylol group of the hydroxybenzyl phenol and the ortho ring positions of the 4,4'-dihydroxydiphenylmethane are most prone to react, then any crystalline product of this reaction having molecular weight of 306 is expected to be the 2,4-bis isomer. We have shown that this reaction can be induced to give a crystalline product with molecular weight of 306 and melting point of 149–150° C. The hydroxyl content was by test correct for the formula of Isomer II. Its phenolic reactivities are three as expected.

The infra-red absorption has been extensively measured for 2,4-bis-(4-hydroxybenzyl) phenol. Among the bands noted are infra-red absorption band peaks at 9.85 and 12.1 microns which band peaks are also found in parahydroxybenzyl alcohol and judged to be bands of the parahydroxybenzyl radical. This triphenylol also gives infra-red absorption bands at 2.98, which indicates the presence of phenolic hydroxyl groups; at 3.4 which indicates the presence of methylene groups; at 6.2 and 6.7 as expected for a disubstituted phenyl ring. No bands were found which are inconsistent with the above formula for Isomer II. Thus the structure of the new compound 2,4-bis-(4-hydroxybenzyl) phenol is considered as proven to be that shown in the structural formula for Isomer II.

The purified 2,4-bis-(4-hydroxybenzyl) phenol may be re-crystallized from the molten isomer when cooled slowly. When the melt is cooled rapidly, for example, at about 10° C. per minute, it forms a glassy product which gives conchoidal fractures under a blow, like most organic resins. However organic resins generally lack a sharp melting point but this glassy product in finely ground form melts sharply, the same as does the crystalline form.

In much the same way the structure shown for 2,6-bis-(2-hydroxybenzyl) phenol, Isomer III has been established. It shows infra-red absorption at the proper values for both 2,2'-hydroxyl ($2.85\mu$) and for 2-hydroxybenzyl radicals ($9.60\mu$). Due to some shifts in hydroxy bonding, this isomer may show some differences in infra-red absorption between its crystalline state and its glassy state, but the absorptions are largely the same for both states.

Since the infra-red absorption data can distinguish between the 2-hydroxybenzyl radical and the 4-hydroxybenzyl radical, then it can be extended to distinguish the isomers obtained in resinous form, for instance the Isomers I and IV. With the Isomers V and VII, the end radicals are in each case half 2-hydroxybenzyl and half 4-hydroxybenzyl and other means in addition to infra-red absorption data must be then used to tell which isomer is present. In this case the reactivity of the isomers with hexamethylenetetramine can serve as a means for identifying, since the reaction is more rapid with Isomer VII than with V.

The invention is specifically exemplified in the following examples.

Example 1

Under an atmosphere of nitrogen, 300 grams (1.5 moles) of 4,4'-dihydroxydiphenylmethane and 12.4 grams of 4-hydroxybenzyl alcohol were dissolved in 740 ml. of ethylene glycol and then heated to 182–195° C. for 1.5 hours, yielding a resinous solution. The ethylene glycol was then removed by distilling the solution to 200° C. at 20 mm. pressure; residue yield 312.5 grams. This residue product was separated into the following fractions by a combination of distillation and crystallization; 85.5 per cent of the original 4,4'-dihydroxydiphenylmethane was recovered as the pure material and another 3.4 per cent in an impure form. Crystals with molecular weight of 300–306 were recovered as impure 2,4-bis-(4-hydroxybenzyl) phenol, melting point 146–148° C. to equal 39.2 per cent of the theoretical yield. This was recrystallized from 35 per cent acetic acid-water solution to yield 5.7 grams of purified crystalline 2,4-bis-(4-hydroxybenzyl) phenol (Isomer II).

These crystals melted at 149–150° C. and gave with 19.1 per cent by weight of hexamethylenetetramine a reaction speed at 160° C. of 160 to 170 seconds. They reacted with acetic anhydride to give a crystalline triacetate melting point 91–92° C. The molecular weight by boiling point methods in acetone, benzene and alcohol varied from 297 to 303. The hydroxyl values by the acetic anhydride-pyridine method were 16.3 to 16.4.

Example 2

Isomer II was also obtained when 135 grams (4.5 moles) of paraformaldehyde were mixed with 616 grams of concentrated HCl, then gaseous anhydrous HCl was passed in until the paraform was in solution. This solution was added slowly to a solution of 2538 grams (27 moles) phenol in 1 liter ethyl ether and 16.6 ml. of 75 per cent thioglycollic acid at 0 to −5° C. with stirring by nitrogen gas stream. The complete solution was stirred for 1 hour at 0° C. then allowed to warm to 5° C. and stored for 12 hours. Ether, water, HCl and excess phenol were removed by vacuum distillation until a residue temperature of 165° C. at 20 mm. pressure was reached. 800 grams of light yellow resin was obtained as a residue which slowly crystallized. This residue was distilled at 0.4 to 0.5 mm. pressure until 512 grams distillate, mostly a mixture of dihydroxydiphenylmethanes, was obtained as a first fraction.

The second fraction of distillate collected at 239–261° C. in vapor at 0.4 to 0.8 mm. pressure, when cooled was a resinous product. Yield 141.2 grams. This crystallized from 35 per cent acetic acid gave 21.6 grams of crystals of slightly impure 2,4-bis-(4-hydroxybenzyl) phenol melting at 142–145° C.

Example 3

A mixture of 60 grams of 2,2'-dihydroxydiphenylmethane, melting point 119–120° C., and 12.4 grams (0.1 mole) saligenin, melting point 85–86° C., and 2 grams ZnO as catalyst were heated at 165–190° C. for 30 minutes. Then the reaction mass was distilled to a residue temperature of 200° C. Residue weight 71.5 grams.

This residue was distilled to a temperature of 230° C. and at 1–2 mm. pressure to give a first distillate consisting of 36.3 grams of 2,2'-dihydroxydiphenylmethane, a second distillate between 240° and 260° C. of 22.0 grams which was subsequently used in Example 7 and a resinous residue of 13.2 grams.

The resinous residue crystallized from benzene gave 4.5 grams crystals melting at 160–161° C. and which were identified as Isomer III. Hydroxyl determinations of the crystal gave 16.48 theory being 16.66. Molecular weight measurement gave 297 for boiling point methods with acetone solvent and 327 using benzene. The crystals acetylated gave a triacetate having a melting point of 95.6 to 97.4° C. and brominated gave a solid having a melting point of 216–217° C. The crystals were distillable at 250° C., 0.5 mm. pressure with only a trace of decomposition. These crystals when reacted with 10 per cent by weight of hexamethylenetetramine heat-hardened to an infusible resin in 17 seconds at 160° C.

Example 4

A novolak type resin was made from 10 moles phenol, 1 mole formaldehyde and enough ZnO to hold the pH at pH 5–6 by reacting for one hour at 100° C. then at 160° C. for about 30 minutes or until all formaldehyde odor had disappeared. The unreacted phenol was removed from the reaction mass by distillation up to a residue temperature of 180° C. at 1 mm. pressure. A 170 gram yield of residue resin was obtained. This was a low melting point novolak type resin which was distilled under vacuum to remove all products boiling up to 210° C. at 1 mm. pressure; 85 grams mostly dihydroxydiphenylmethanes came off. The residue of 84 grams was distilled under vacuum of .2 mm. pressure to a residue temperature of 270° C., 11.3 grams distilled between 235 and 260° C. which crystallized from benzene gave 3.9 grams with a melting point 160–161° C. These crystals tested by mixed melting point technic and by other tests were identical with those of Example 3, and hence these crystals were 2,6-bis-(2-hydroxybenzyl) phenol.

Example 5

A reaction mixture consisting of 2.0 grams of 2,6-dimethylol phenol, 24.5 grams phenol, and 0.1 gram ZnO was heated twenty minutes at 165–175° C.; then unreacted phenol was removed under vacuum to a residue temperature of 200° C. at 1 mm. pressure. The residue was dissolved in benzene and cooled. One gram of crystals having a melting point of 159–161° C. was obtained. This by mixed melting points was identified as 2,6-bis-(2-hydroxybenzyl) phenol being identical with the product of Example 3.

Since 2,2'-dihydroxydiphenylmethane when reacted with 2-hydroxybenzyl alcohol, as in Example 3, and 2,6-dimenthylol phenol when reacted with phenol can give only one common reaction product, namely, 2,6-bis-(2-hydroxybenzyl) phenol, then the results of Examples 3 and 4 are a chemical proof for the structure assigned to this isomer.

Example 6

A resinous triphenylol having the structural formula depicted for Isomer V was produced when 4,4'-dihydroxydiphenylmethane was condensed with saligenin. This distillable triphenylol which was isolated as a sharp melting resin reacted with 10 per cent by weight of hexamethylenetetramine to give an infusible resin in 75 seconds at 160° C. This is a sharp melting resin (25°–30° C. by capillary tube method) which has utility similar to the present broad melting range resins called novolaks.

(A) 60 grams of 4,4'-dihydroxydiphenylmethane were dissolved in 150 cc. of acetic acid and warmed to 60° C. to facilitate solution; then 12.4 grams saligenin were added to the solution and heated to 80° C. until all the saligenin was dissolved. About 5 cc. of dry HCl gas were introduced slowly. The mass self heated to 90° C. and then cooled slowly to room temperature. The acetic acid was then distilled off to 200° C. under 40 mm. pressure, leaving a residue of 71.0 grams. The residue was distilled, removing a first fraction of 46.3 grams of 4,4'-dihydroxydiphenylmethane. At a vapor temperature of 234–275 and at 1 mm. pressure a resinous distillate of 12.7 grams was obtained. This last distillate was identified as 2-(2-hydroxybenzyl)-4-(4-hydroxybenzyl) phenol or Isomer V.

(B) This reaction was repeated but without the solvent and using 2.0 grams ZnO as catalyst. A yield of 9.2 grams of distillable resin was obtained which corresponded to the resin produced in (A) above and was identified as 2-(2-hydroxybenzyl)-4-(4-hydroxybenzyl) phenol.

The distillable novolak type reaction products made under procedures (A) and (B) when tested for molecular weight values have given results between 290 and 320, indicating that the distilled resinous products consist of 90 per cent or more of triphenylols of the expected 306 molecular weight size. Only one structural formula is possible for Isomer V, but such product can exist in two different orientation configurations with regard to the hydroxyl groups; one is in the class of products which are called hydrogen bonded, and hence similar to certain diphenylols described in U. S. 2,464,207. Since such orientation effects are the result of internal rotation of the molecule it is considered that both these configurations will be much alike in a chemical reaction such as hardening with formaldehyde. Isomer V has four open ortho positions and one open para position whereas the product of Example 1, Isomer II has five open ortho, but no open para positions. The replacement of one open para for one ortho has greatly increased the speed of heat-hardening with hexamethylenetetramine.

Procedure (A) repeated without addition of 4,4'-dihydroxydiphenylmethane gave a nondistillable resinous residue of 9.0 grams and no resinous distillate. This indicates that when saligenin is reacted with a diphenol the yields are lowered by self condensation of the saligenin.

Example 7

The second distillate fraction of Example 3 weight 22.0 grams by crystallization from a benzene solution gave 4.5 grams of a crystalline product identified as 2,6-bis-(2-hydroxybenzyl) phenol. The remainder of this distillate (17.0 grams) was obtained as a resin from the benzene mother liquors by distilling off the solvent. This resinous product gave molecular weight values of 300 to 320 and was identified as Isomer I. The same isomer in resinous form can be made by reacting 2,4-dimethylol phenol with phenol, and also can be made from 2,4'-dihydroxydiphenylmethane reacted with 2-hydroxybenzyl alcohol using a reaction pH 4–10 and in the presence of catalysts such as the oxides, or basic salts of aluminum, magnesium and zinc, which catalysts favor the production of triphenylols having methylene groups in ortho positions to the hydroxyl groups.

Example 8

A reaction of 2.0 grams of 2,6-dimethylol phenol with 24.5 grams phenol at 165° C. for 30 minutes, was followed by distillation of unreacted phenol to a residue temperature of 200° C. at 10 mm. pressure. Further distillation at 1 mm. pressure gave 3.9 grams of resinous distillate. From this distillate dissolved in benzene there was obtained 2.0 grams of crystals, identified as Isomer III, namely, 2,6-bis-(2-hydroxybenzyl) phenol. The balance of the distillate was a resinous mixture of 2,6-bis-(4-hydroxybenzyl) phenol and 2-(2-hydroxybenzyl)-6-(4-hydroxybenzyl) phenol, said mixture having a molecular weight of 306±10. This mixture had a heat-hardening speed with 10 per cent by weight of hexamethylene-tetramine at 160° C. of 60 seconds.

Isomer IV in admixture with some Isomer VI can be produced by reaction of 2,4'-dihydroxy-diphenylmethane with 4-hydroxybenzyl alcohol using the ortho directing type catalysts described in Example 7.

Isomer VI has been produced by reaction of 2,4 dimethylol phenol and excess phenol under neutral or slightly acid conditions. Better yields are obtained however when 2,4-dihydroxydiphenylmethane is reacted with saligenin under mild acid conditions, pH 3 to 6, and preferably with an excess of the diphenylmethane over equimolar amounts.

Example 9

200 grams of 2,4'-dihydroxydiphenyl methane were melted and ammonia gas added until a sample in an equal volume of water when tested had a pH of 6.0.

12.4 grams saligenin were stirred into the melt and the mixture heated for 1 hour at 125° C. The mass was then heated to 160° C. for 1 hour. Vacuum was applied to a pressure of 1 mm., then the unreacted diphenol was distilled off to a vapor temperature of 230° C. Residue yield was 32. grams.

This residue was distilled at 0.5 mm. pressure and a resinous distillate collected at 240–260° C., yield 20.1 grams. This resinous distillate tested with 19.1 per cent by weight of hexamethylenetetramine became infusible in 135 seconds at 160° C. Tested with formalin (1.5 methylene ratio) it hardened in 49 minutes at 100° C. When dissolved in benzene or toluene, or glacial acetic acid or water or combinations of these solvents, it came out on cooling as an oil or a resinous mass. Redistillation did not induce any change in its properties, thus it is considered as a resinous chemical.

Example 10

300 grams of 2,2'-dihydroxydiphenylmethane were melted by being heated to 120° C., then a catalyst consisting of .026 grams ZnO dissolved in 0.274 gram wood resin was added, and the mixture was then held at 120° C. This catalyst may be considered as rosin buffered zinc rosinate. There was then added slowly a solution of 12.4 grams of 4-hydroxybenzyl alcohol in 25 ml. of anhydrous ethyl alcohol. The mixture was gradually heated to 200° C. in the course of 30 minutes, allowing alcohol to distill off. The mixture was then cooled to about 100° C. and dissolved in 312 grams of 60 per cent acetic acid. Upon cooling the acidified solution to room temperature, a precipitate of 254.7 grams of crystalline 2,2'-dihydroxydiphenylmethane was obtained. The solvent was then distilled off from the residue and the lower boiling fractions discarded. Continuing the distillation, a fraction distilling at 220–245° C. in vapor at 350–500 micron pressure was obtained which consisted of 17.3 grams resin and was identified as Isomer VII, namely, 2-(2-hydroxybenzyl)-6-(4-hydroxybenzyl) methane having a heat-hardening speed of 56 seconds using 19 per cent by weight of hexamethylenetetramine at 160° C.

This same distillable resinous product was produced by the reaction of 2,6 dimethylol phenol with phenol at a pH of 4–5, preferably using more than two moles of phenol per mole of dimethylol phenol.

It has been found that in condensing a molar quantity of formaldehyde with at least 1.8 moles phenol at a reaction pH between 3.0 and 8.0 novolak type products are obtained consisting of a mixture of diphenylol methanes, triphenylols and some higher polyphenylols of more than three ring size. By subjecting such mixed products to distillation, all or part of the diphenylol methanes can be removed, leaving as the major residue a resinous mixture of triphenylols difficult to separate into individual isomers. Partly distillable mixtures consisting of 50 per cent and more of triphenylols have sharp melting points, and thus are useful in molding mixtures because these resins impart good flow properties to the composition when molded. Crystalline mixtures are sometimes found in the residues after distillation to remove all the diphenylols, which mixtures are quite sharp melting and come down unchanged from various selected solutes. The infra-red absorption data such as the 9.85 micron band shown by 4-hydroxybenzyl radical and the 9.60 band shown by the 2-hydroxybenzyl radical is often helpful in distinguishing those mixtures which are sharp melting resins or are sharp melting crystals from the purified isomers.

In the direct reaction of phenol and formaldehyde it has been previously postulated that three ring products were formed. However they have previously never been discovered or characterized as individual chemicals. In employing at least three moles of phenol to each mole of formaldehyde the condensation can be directed largely towards the production of diphenylol and triphenylol products. Mixtures of triphenylols are usually obtained and these are difficult to separate. From such mixtures there have been isolated two crystalline products as the isomer 2,6-bis-(2-hydroxybenzyl) phenol as previously shown in Example 4 and 2,4-bis-(2-hydroxybenzyl) phenol as shown in Example 2. In addition we have found distillate resins and crystalline materials which are mixtures, all of which by test show a molecular weight of 300 to 320 and all have sharp melting points, although some resins melt at only room temperatures.

*Example 11*

A resin was produced by reaction of 400 grams of formalin (37.5 per cent), equal to 5 moles, with 1880 grams of phenol equal to 20 moles, and 1 gram of ZnO dispersed in 12 grams wood resin by heating for one hour at 100° C. then raising the temperature to 160° C. distilling off water and holding at 160° C. until the formaldehyde had completely reacted.

The resinous product was distilled free of phenol. Residue yield was 910 grams. This residue was distilled at 1 mm. pressure to recover 440 grams of mixed crystalline diphenylols. The residue resin yield was 470 grams and did not distill at 210° C. at 1 mm. This resinous residue was then heated to higher temperatures, 210 to 260° C. at 0.4 to 0.9 mm. pressure. The distillate fraction at vapor temperatures of 240 to 300° C. was 401 grams which when crystallized from 60 per cent acetic acid gave 28 grams of purified crystalline 2,6-bis-(2-hydroxybenzyl) phenol melting point 161–162° C. and which reacted with hexamethylenetetramine (15 per cent by weight) to an infusible resin in 20 seconds at 160° C.

The mother liquor remaining after separation of the 2,6-bis-(2-hydroxybenzyl) phenol was concentrated and again distilled at 240–260° C., yielding 300 grams of resinous distillate. This was tested with 15 per cent by weight of hexamethylenetetramine and gave a heat-hardening reaction speed of 51 seconds at 160° C. The nondistilling residue of unknown composition was also tested in the same manner and gave a test speed of 42 seconds at 160° C.

The 300 gram distillate fraction was dissolved in sufficient 90% benzene 10% acetone solvent to give a saturated solution at 60° C. This was then slowly cooled to 25° C. and 24 grams of crystalline 2,6-bis-(2-hydroxybenzyl) phenol obtained. The mother liquor was distilled free of solvent and the residue dissolved in a mixed solvent of 10 per cent acetone+90 percent benzene at 60° C. This was slowly cooled to 5° C. and 111 grams of crystals obtained. These crystals exhibited a melting point of 114.2–115.6° and while at first regarded as a pure compound the crystals when tested in admixture with pure known isomers gave depressions in melting point. The crystals were then examined for infra-red absorption, which indicated that 31 per cent of its two ends as being 4-hydroxybenzyl radicals and 69 per cent of the ends as 2-hydroxybenzyl radicals. Since no single product with molecular weight 306 would seem to have such a composition this is believed to be a new mixed crystalline novolak product with a sharp melting point in the range of the present commercial novolak resins which, however, have very broad melting point ranges, for instance, a typical commercial novolak when tested by the capillary melting point method, begins to melt at 86° C. and is not completely melted until heated to 96° C.

This crystalline mixture was tested for heat-hardening speeds with 19 per cent by weight of hexamethylenetetramine at 160° C. and found to harden to an infusible resin in 60 seconds. With 2.5 moles formalin per 306 grams sample, plus 15 grams NaOH in 50 per cent solution (water+formalin excess) at 100° C., the reaction mass solidified in 14 minutes to an insoluble gel.

Novolak resins from phenol and formaldehyde can be produced which consist of more than 50 per cent of actual triphenylols, the balance being diphenols and polyphenylols of more than 3 ring size, by control of three factors, catalysts, reaction pH and excess of phenol used. The capillary melting points of such novolaks containing a major portion of triphenylols are reasonably sharp, that is, within 5° C. from first liquid until clear melt. The triphenylol portion of such novolaks may be separated by distillation using vacuum systems of less than 1 mm. or vacuum gas current systems at 1 mm. pressure where the gas temperatures are between 220° C. and 260° C. Decomposition effects with loss of yield became quite disturbing above 260° C.

With any selected catalyst or pH the excess of phenol reactant over equimolar proportions with formaldehyde largely determines the average molecular size of the novolak resin. To obtain triphenylols in major part, at least 1.8 moles phenol per 1.0 mole formaldehyde is indicated, and preferably about 5 moles. With more than 5 moles phenol and upwards to 10 moles phenol, the yield of triphenylol progressively decreases, attended by an increase in diphenylol products.

Other factors besides the phenol ratio which effect the production of crude resinous triphenylols directly from phenol and formaldehyde are hereinafter discussed.

1. Reaction pH: A catalyst or catalyst combination is selected to bring the pH of the reacting system, measured with an equal weight of water, between pH 3.0 and 8.0. Too low a pH will cause excessive amounts of diphenylols to form; too high a pH results in the formation of large amounts of molecules higher than three rings.

2. Catalysts: To produce triphenylols with the more rapid heat-hardening speeds when reacted with hexamethylenetetramine, some Zn, Mg or Al ion should be present during the production of the isomers as catalyst. The basic salts, oxides or hydroxides of these metals are suitable for this purpose.

There are in addition other catalysts which can be employed to effect a reaction pH between 4 and 8. In general however these catalysts promote production of those isomers which heat-harden slowly in reaction with hexamethylenetetramine. Examples of such catalysts are ammonium hydroxide employed in amount imparting a reaction pH of 7.9; others of this type include the alkalis and alkaline earth oxides and hydroxides. Mineral and organic acid catalysts, for example, oxalic acid, hydrochloric acid, phosphoric acid and sulphuric acid also favor production of the slow heat-hardening type isomers in reaction with formaldehyde or hexamethylenetetramine.

*Example 12*

Phenol, 940 grams 10 moles was reacted with formalin 81 grams, 1 mole, and with 1 gram zinc oxide as catalyst. The reaction mass was heated for 1 hour at 100° C. and then 30 minutes at 160° C. Thereafter the unreacted phenol and the diphenylols which had formed were removed by distillation at reduced pressure. The yield of phenol free, diphenylol free resin was 40.3 grams of solid resin. This measured for molecular weight by boiling point in acetone gave 330 molecular weight. It reacted with 19 per cent by weight of hexamethylenetetramine at 160° C. to heat-harden in 25 seconds. This rapid heat-hardening rate is desirable in resins employed in molding mixtures.

The resin was dissolved in toluene, then filtered free of excess zinc salts and a small amount of insoluble material. The solution when cooled to 25° C. gave 2.0 grams of a partly crystalline mass melting point 156–159° C. which was identified as crude Isomer III having with 10 per cent by weight of hexamethylenetetramine a heat-hardening speed at 160° of 21 seconds. The residue from the mother liquor distilled at 0.3 mm. pressure between 245° C.–265° C. gave 29.0 grams distillate (equal to 76.9 per cent content of triphenylols in the phenol-free residue resin yield). This tested for molecular weight gave 290 and with 10 per cent by weight of hexamethylenetetramine, a heat-hardening speed at 160° C. of 22 seconds.

Mixtures of diphenylols are more economical to produce than are the purified individual isomers and such mixtures are suitable for many resin uses. When such mixtures are made into triphenylols as by condensation with saligenin or parahydroxybenzyl alcohol, or with phenol and formaldehyde they give mixed triphenylol products mostly resinous in type, but suitable for a variety of uses. The catalyst used in converting diphenylol to the triphenylol state affects the structure of the triphenylol and thus affects the final hardening speed.

This was demonstrated when definite mixtures of diphenylols (1 mole) were reacted with a mole of formaldehyde and excess phenol (2–3 moles), then freed from excess phenol and any diphenylols under vacuum and the residue resin tested for triphenylols. Novolak type resinous residues of more than 60 per cent triphenylol content were obtained and their reactivity with 10 per cent by weight of hexamethylenetetramine at 160° C. to heat-harden to an infusible resin are recorded in Table II.

TABLE II

| Diphenylol Crystal Mixture Used | | | Catalyst Used To Produce Triphenylols | pH of Reaction Mixture (diluted) | Time for Residue Resin to Heat-harden at 160° C., seconds |
|---|---|---|---|---|---|
| Percent 2,2' | Percent 2,4' | Percent 4,4' | | | |
| 15 | 46 | 39 | HCl | 2.6 | 105 |
| 5 | 67 | 28 | NH₃ | 7.9 | 95 |
| 30 | 70 | 0 | Formic Acid | 2.8 | 72 |
| 32 | 68 | 0 | Al(OH)₃ | ----- | 65 |
| 50 | 50 | 0 | Boric Acid | 4.9 | 60 |
| 50 | 50 | 0 | Acetic Acid | 3.7 | 50 |
| 70 | 30 | 0 | Al(OH)₃ | ----- | 30 |

From these results it is evident that one can greatly change the hardening speed of a triphenylol containing novolak resin by making it from different diphenylol mixtures or by choice of catalysts with any one available diphenylol mixture.

The following example illustrates the effect various type metallic ions present in different catalysts with regard to favoring production of triphenylol mixtures that can be distinguished from one another by their heat-hardening speed in admixture with hexamethylenetetramine.

*Example 13*

A master reaction mixture was prepared consisting of 3 moles phenol and 2 moles formalin solution (37½ per cent formaldehyde); which reaction mixture had a normal pH of 4½ at room temperature. The master mixture was divided into three portions and to each portion there was added a catalyst from the group consisting of zinc acetate, magnesium acetate and a mixture of sodium hydroxide and acetic acid in amount to impart a pH between 5 and 6 to the reaction mixture. Each reaction mixture was then reacted in a manner similar to that described in Example 12 or until all the free formaldehyde had been consumed. Each reaction mixture was then subjected to distillation to first remove all unreacted phenol and then to about 250° C. at 1 mm. pressure to yield in each instance a distillate consisting of about 90 per cent triphenylol and the balance diphenylols. Each distillate was then mixed with 19 per cent by weight hexamethylenetetramine and tested for heat-hardening at 160° C. The zinc acetate catalyzed distillate took 24 seconds to harden; the magnesium acetate distillate 21 second to harden, and the mixture of sodium hydroxide and acetic acid yielded a distillate taking 40 seconds to harden. These results indicate that at the same reaction pH a magnesium salt tends to produce triphenylol mixtures which in reaction with hexamethylenetetramine heat-harden more rapidly than those made in the presence of other catalysts having zinc or sodium ions.

What is claimed is:

1. Process for obtaining a triphenylol derivative of phenol and formaldehyde which comprises condensing a molar amount of hydroxybenzyl alcohol with at least a molar amount of a hydroxy-hydroxy'-diphenyl methane.

2. Process for obtaining a triphenylol derivative of phenol and formaldehyde which comprises condensing a molar amount of 4-hydroxybenzyl alcohol with at least a molar amount of 4,4'-dihydroxy diphenyl methane.

3. Process for obtaining a triphenylol derivative of phenol and formaldehyde which comprises condensing a molar amount of ortho-hydroxybenzyl alcohol with at least a molar amount of 4,4'-dihydroxy diphenyl methane.

4. Process according to claim 1 wherein the hydroxybenzyl alcohol is 2-hydroxybenzyl alcohol and the hydroxy-hydroxy'-diphenyl methane is 2,2'-dihydroxydiphenyl-methane.

5. Process according to claim 1 wherein the condensation reaction is maintained at a pH value between 4.5 and 10.0.

References Cited in the file of this patent

UNITED STATES PATENTS

| 1,020,593 | Aylsworth | Mar. 19, 1912 |
| 1,982,651 | Florenz | Dec. 4, 1934 |
| 2,116,084 | Saunders | May 3, 1938 |
| 2,400,718 | Siegel | May 21, 1946 |
| 2,475,587 | Bender et al. | July 12, 1949 |

FOREIGN PATENTS

| 668,952 | Germany | Dec. 13, 1938 |
| 673,828 | Germany | Mar. 29, 1939 |

OTHER REFERENCES

Baekeland: Jour. Industrial and Engineering Chemistry, vol. 5, No. 6, pages 1–15, June 1913.

Koebner: Angewandte Chemie, vol. 46, pages 251–256, May 6, 1933.